Patented June 24, 1930

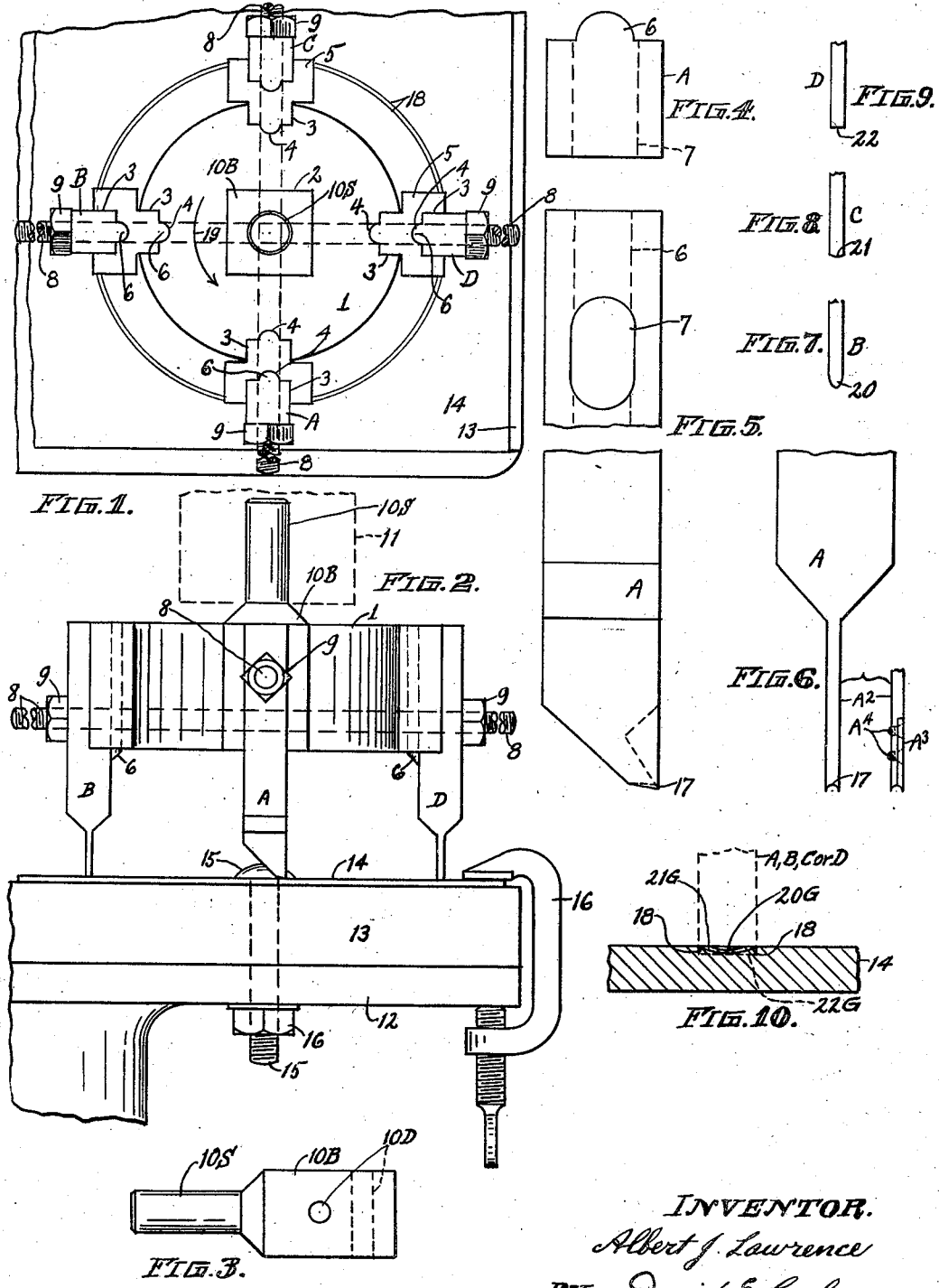

1,765,799

UNITED STATES PATENT OFFICE

ALBERT J. LAWRENCE, OF ST. PAUL, MINNESOTA

CIRCLE CUTTER

Application filed May 14, 1928. Serial No. 277,533.

My invention relates to a device for cutting circular holes of various sizes as desired in sheet metal, the device is also useful for a similar purpose for other materials such as sheet fiber, wood veneer or other flat materials which may be cut by rotary cutting tools as hereinafter described. The main object of this invention is to provide a simple highly efficient circular cutting device applicable for use in drill-presses, lathes or any other machine having a rotary spindle adapted to be fed toward a base plate on which is secured a plate element to be worked on. In the accompanying drawing,—

Fig. 1 is a top view of my device in operative position about to cut a circular hole in a piece of sheet metal laid on a base plate.

Fig. 2 is a front elevation of Fig. 1 with some added details.

Fig. 3 is a side elevation of the spindle of my device.

Figs. 4 and 5 are respectively top and side elevations of the primary cutter bar tool A which is detachably securable in a chuck 1 of the device and Fig. 6 is a front view of the cutting portion of the tool A looking towards Fig. 5 from the right, and a modification of said cutting part.

Figs. 7, 8 and 9 are, respectively, front detail views of cutting bars B, C and D showing only the cutting elements thereof, the upper parts of all cutter bars being practically identical and said cutters being used successively in the order in which they are lettered.

Fig. 10 is a greatly enlarged sectional detail of a portion of a plate to be cut and showing the preferred manner of making cuts therein with the four cutting tools.

Referring to the drawing by reference numerals and letters, 1 designates a solid one piece chuck of cylindrical form with a square central bore 2 and a number of longitudinal rectangular grooves 3 cut into its exterior circular face said grooves 3 being shown as 4 in number and equally spaced. The bottom of each groove is formed with a longitudinal inner and central rounded groove 4 serving as a keyway for a correspondingly ribbed filler block 5 said block fitting also snugly in the groove 3. Each said block 5 has an outer groove 3—4 corresponding to the similarly numbered parts of the chuck of said grooves being normally vertical. Each cutter bar is formed at one side with a rounded rib 6 adapted to be fitted in either the groove 4 of the filler blocks or the corresponding groove 4 in the chuck where the front and rear vertical sides of each bar fits snugly within groove 3. The lower and cutting element of the bars are of various shapes for a purpose presently to be described, said lower ends being reduced downwardly as best shown in Fig. 6 and their cutting elements being arranged in a predetermined order. The cutter bars are provided in corresponding pairs arranged detachably as described in diametrically opposite sides of the chuck and 7 are longitudinal apertures in the shank of said cutter bars arranged for passing a threaded bar 8 therethrough. Each said threaded bar extends diametrically through the chuck and extends with its opposite threaded ends outwardly of its pair of cutter bars and 9 are threaded nuts one for each end of said threaded bar and adapted to be turned to engage and rigidly hold the adjacent cutter bar as best shown in Figs. 1 and 2.

Where there are four cutter bars employed, as shown, it is obvious that two adjustment rods 8 are required and these are arranged to cross each other within the chuck one above the other therefore making it necessary to have the location of the aperture 7 in the cutter bars correspondingly located. For example the apertures 7 in the cutter bars A and C are at one elevation while the corresponding apertures in cutter bars B and D are at a lower elevation.

The chuck of this device requires a spindle, the main body portion of which is square in cross section to fit snugly within the bore 2 of the chuck, said body portion being designated 10B in Fig. 3 and is of course drilled as 10D comprising two transversely arranged holes through which the bolts 8 are passed. The exterior portion of this spindle comprises a suitable shank 10S of any predetermined length and diameter and which is insertable in suitable rotary spindle engaging means of a drill press or other machine and designated as 11 in Fig. 2. In said Fig. 2, 12 indicates a flat base plate of a drill press on top of which is placed preferably a plank 13 on which is placed a sheet metal piece 14 in which is to be cut a large circular hole. Said piece is drilled centrally for a bolt 15 passed downwardly through a plank 13 and base 12 below which it is provided with a tightening nut 16, thus the flat element 14 is securely held. Suitable further holding means such as a clamp 16 may be used to hold the edge portion of said plate 14 tight against the plank and preventing rotation of the plate when the cutting operation begins.

As previously mentioned the cutter bars are of various shapes and their cutting ends are used in certain prearranged order. A might be considered the primary cutter, its cutting element comprising preferably a grooved cutting end 17 which simply cuts into the metal lightly and practically cutting only two concentric circles as 18 in Figs. 1 and 10, into the plate material 14 and on a predetermined diameter. The diameter is of course determined by the thickness of the filler blocks or gage blocks 5 which may be provided in sets of various thicknesses with each chuck. Thus for example an eight inch circle may be cut by putting in filler blocks 5 of the proper thickness to space the cutter bars with the cutting elements exactly four inches from the center of the chuck.

The secondary cutter of my device follows cutter A and is of course spaced ninety degrees as is readily understood from Fig. 1 in which the arrow 19 designates the direction of rotation. Said cutter B is preferably narrow and round as best shown in Fig. 7 at 20. Said rounded cutting edge 20 cuts a slight groove 20G between the cuts 18 previously made by cutter A. The cutter bar designated C has a more shallow but rounded cutting edge 21 cutting a deeper groove in the path of the grooves cut by A and B said deeper cut being designated 21G in Fig. 10. The last cutter bar D has a square cutting edge 22 (see Fig. 9) which removes the balance of the material between the grooves 18 as to the dotted line 22G in Fig. 10. In Fig. 6 the small detail to the right indicates the grooved cutter part of A in two parts designated A² and A³ of which A³ is detachably secured to A² as with screws A⁴, this construction providing for one half of the groove 17 in each part and which is thus more easily ground to right shape, or sharpened.

It is obvious that the cutting ends of the tools A, B, C, and D may be of various designs. I prefer to use a primary cutter with a point as shown in full lines in the lower part of Fig. 5 while the dotted V-shape line in said figure indicates a preferred shape of the cutting ends of the tools following the primary cutter.

It will be readily understood that for cutting out circular pieces of small diameter it may be necessary to make a curvature rearwardly of each cutting element said curvature being of course inwardly directed so as to provide clearance when the device is in operation. However the main object of this cutting apparatus is to make comparatively large circular cutouts in sheet metal and leaving clean cut edges in the aperture.

The cutting operation above described reveals a successive operation on a metal by the cutters it being readily understood that the operation continues by feeding the device downwardly gradually into the metal until it is cut through. It is obvious that when the tools make the final cut the central circular disc is held rigid by the bolt 15 and the main part of the plate is suitably held rigid and there is no possibility of said cut out circular part becoming loose and damaging the cutting members.

The above specification fully discloses the construction and operation of my device. It will be readily understood that any modifications of the structure such as providing a larger number of cutters or variation in the shape of the cutting elements will come within the spirit and scope of the invention. A wood block 13 has been specified as a base for the sheet metal 14 to be clamped upon as it has been found best for the purpose described and when the cutting tools go through the metal their cutting edges are not effected. Any other equivalent base may be used.

In the art it has hitherto been common practice to make circular holes in sheet metal or other plate material by first drilling a circular row of small holes, then chipping out the metal between them and filing or grinding the aperture to proper contour, a tedious and unsatisfactory method, in comparison with which the accuracy and speed of my device is readily seen.

I claim:

In a circle cutter of the class described, the combination of a cylindrical chuck having a number of equally spaced longitudinal grooves in its exterior face, said chuck having a central polygonal bore, a shank member with one end shaped to fit removably in said bore and a round concentric shank portion normally exteriorly of the chuck body, cutter bars with shanks adapted to lie one in each of said grooves and having each an elongated bore, means for holding said cutter bars in pairs with their cutting ends a predetermined distance from the chuck, said latter means comprising for each pair of diametrically opposite cutter bars a bar threaded at both ends and passed diametrically through the chuck and said bars and a nut exteriorly of each cutter bar, threaded on said bar to clamp said pairs of cutter bars inwardly and to frictionally retain each bar in its groove, and gage blocks for said grooves provided in sets, each block having a longitudinal rib arranged to fit in one of said grooves of the chuck and an outer groove adapted to snugly receive a cutter bar and said blocks provided with elongated apertures corresponding to the apertures of the cutter bars.

In testimony whereof I affix my signature.

ALBERT J. LAWRENCE.